Patented Aug. 10, 1926.

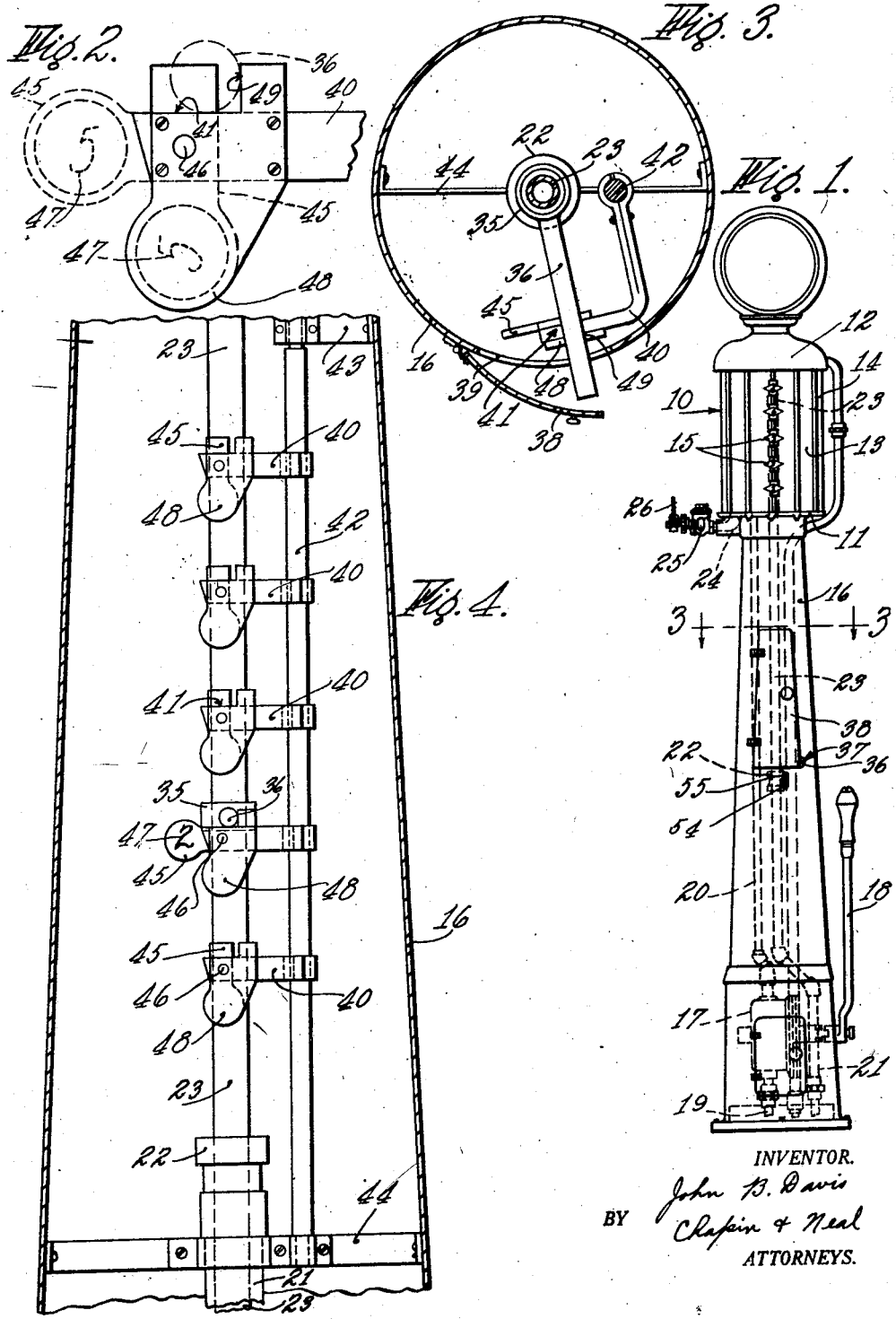

1,595,229

UNITED STATES PATENT OFFICE.

JOHN B. DAVIS, OF SPRINGFIELD, MASSACHUSETTS, ASSIGNOR TO GILBERT & BARKER MANUFACTURING COMPANY, OF WEST SPRINGFIELD, MASSACHUSETTS, A CORPORATION OF MASSACHUSETTS.

INDICATOR FOR QUANTITY STOPS.

Original application filed September 15, 1924, Serial No. 737,801. Divided and this application filed May 26, 1925. Serial No. 32,961.

This invention relates to indicators for quantity stops and the like and is especially adapted for use in connection with the quantity stops of liquid dispensing apparatus of the types commonly used for dispensing gasoline, to indicate in a novel manner the quantity of gasoline for which the apparatus is set to deliver.

This application is a division of my copending application Serial No. 737,801, filed September 15, 1924.

The object of the invention is to provide a quantity indicator for each of the quantity stops of the apparatus, each of said indicators being normally concealed from the purchaser but movable into display position when the stop is engaged by its cooperating member, whereby the purchaser may readily determine the quantity which the apparatus is set to deliver.

Other objects and advantages will appear in the following description and in the illustrative embodiment of the invention in the accompanying drawings, in which:—

Fig. 1 is a small scale elevational view of a liquid dispensing apparatus embodying the invention;

Fig. 2 is an enlarged elevational view of one of the quantity stops and the quantity indicator associated therewith;

Fig. 3 is an enlarged sectional plan view taken on the line 3—3 of Fig. 1; and

Fig. 4 is an enlarged fragmentary sectional elevational view of the apparatus, illustrative of the quantity stops, and of the quantity indicators.

The liquid dispensing apparatus, chosen by way of illustrative example as a background for this invention, is of the socalled visible measuring type. It includes a measuring receptacle 10 having a base 11, a cap 12 and a transparent cylindrical wall 13 disposed therebetween and held in place by tie bolts 14. Suitable quantity indicators 15 are provided adjacent glass 13 to define the levels occupied by various measured unit quantities of liquid in the receptacle. The base 13 is supported on the upper end of a hollow pedestal 16. The lower part of this pedestal houses a suitable pump 17,— that illustrated being of the wing piston type oscillatable manually by a lever 18. A pipe 19 is adapted to connect the inlet of the pump 16 to the supply tank and a pipe 20 connects the outlet of the pump to the receptacle 10. A pipe 21 extends from the supply tank upwardly into the pedestal and terminates with a suitable stuffing box 22. An adjustable overflow pipe 23 in receptacle 10 extends downwardly into the pedestal and has its lower end telescoped into pipe 21 and slidably and rotatably engaged by the stuffing box 22. The receptacle 10 is provided with a delivery passage 24 controlled by a delivery valve 25, adapted to be manually opened by a lever 26. The operator, by oscillating handle 18, operates the pump and forces liquid into receptacle 10. By vertical adjustment of the overflow pipe or gage tube 23, any excess over the quantity desired by the purchaser is drained back to the supply tank, after which valve 25 is opened to deliver the desired measured quantity, by gravity flow, from receptacle 10.

Referring to Figs. 3 and 4, the slidable gage tube 23 has fixed thereto a collar 35, to which is attached handle 36, extending radially outward. Handle 36 normally extends out of the pedestal 16 through a recess 37 (Fig. 1) formed therein adjacent a door 38. When this door is opened, handle 36 may be swung out of recess 37 into the door opening 39 and lifted to set the gage tube at any of a number of predetermined levels. For the purpose of holding the tube at such levels, a plurality of stop fingers 40 are provided, each of which has an upper, horizontal, gaging surface 41 upon which handle 36 is adapted to rest. These fingers are secured, preferably in an adjustable manner, as indicated, to a vertical rod 42, which is fixed at its ends in suitable brackets 43 and 44 attached to pedestal 16. The bracket 44 serves also to hold the upper end of the overflow pipe 21.

The feature of this invention is a quantity indicator associated with each stop and movable to display position by the act of engaging handle 36 with a quantity stop. One of these quantity indicators is clearly shown in Fig. 2. It consists of a thin metal piece 45, pivotally connected intermediate its ends at 46 to the stop 40 and normally hanging by gravity in the position shown by full lines in said figure. In this position, the upper portion of member 45 projects above the surface 41 of stop finger 40, whereby it is located in the path of handle 36 and will be engaged and moved thereby as the handle is moved over such surface. In this manner, the indicator is lifted from its depending position and swung through an angle of ninety degrees into the display position illustrated by dotted lines in Fig. 2. The indicator may carry any appropriate marking, usually a numeral such as 47, indicating the number of gallons which will be discharged from the apparatus when handle 36 is engaged with the stop. The indicator, except for the portion projecting above surface 41, is concealed when in normal position by a thin plate 48 which is attached to the front face of finger 40. This plate 48 may be extended above surface 41, as shown, to provide a shoulder 49 to arrest the movement of handle 36 as it is moved over the surface 41. The contour of the side and lower edges of plate 48 are such as to prevent the handle 36 from being engaged with the stop finger 40 in any other manner than that intended, viz, with the surface 41.

The invention has been disclosed herein, in an embodiment at present preferred for illustrative purposes but the scope of the invention is defined by the appended claims rather than by the foregoing description.

What I claim is:—

1. In a liquid dispensing apparatus, a plurality of quantity stops, a movable member having a part adapted to be selectively engaged with any of said stops, and quantity indicators one for each stop and movably mounted adjacent thereto, each indicator being normally concealed behind its stop but having an operating portion projecting beyond the stop into the path of said part so as to be engaged and moved thereby as said part is engaged with the selected stop, whereby the indicator may be moved from its normally concealed position into a display position.

2. In a liquid dispensing apparatus, a visible measuring receptacle, a gage tube movable therein to set the apparatus for the discharge of various predetermined quantities, a plurality of quantity stops, a handle by means of which said gage tube may be manually moved and which is adapted to be engaged with any of said stops, and a quantity indicator mounted adjacent each stop and displayed by the operation of engaging the handle with the selected stop.

3. The combination with a fixed quantity stop and a movable member adapted to be engaged therewith, of a quantity indicator mounted adjacent the stop for movement relatively thereto and adapted to be engaged by said member and moved thereby from a normal to a display position as the latter moves into engagement with said stop, said stop having a part located in front of said indicator and serving to conceal the same when in normal position.

4. In combination, a quantity stop finger having a horizontal gaging surface and a shoulder, a member adapted to be moved over said surface and against said shoulder, and a quantity indicator pivotally connected to said stop finger and normally held by gravity in depending relation therewith, said indicator when in normal position having a part extending above said surface and in the path of said member as it is moved over said surface, whereby said indicator may be lifted from said normal position as said member is moved into position on the stop finger.

JOHN B. DAVIS.